United States Patent [19]

Bauer

[11] 4,350,248
[45] Sep. 21, 1982

[54] X-RAY FILM CASSETTE WITH MAGNETICALLY ATTRACTED CONFINING PLATES

[75] Inventor: Walter Bauer, Munich, Fed. Rep. of Germany

[73] Assignee: Agfa-Gevaert Aktiengesellschaft, Leverkusen, Fed. Rep. of Germany

[21] Appl. No.: 142,442

[22] Filed: Apr. 21, 1980

[30] Foreign Application Priority Data

Apr. 30, 1979 [DE] Fed. Rep. of Germany ....... 2917547

[51] Int. Cl.³ .............................................. G03B 41/18
[52] U.S. Cl. ................................... 206/455; 220/334; 220/342; 378/187; 378/188
[58] Field of Search ................ 206/455, 449; 250/280, 250/281, 282, 480, 481; 220/334, 355, 342

[56] References Cited

U.S. PATENT DOCUMENTS

| | | | |
|---|---|---|---|
| 2,590,891 | 5/1952 | Reuter | 250/480 |
| 3,317,078 | 5/1967 | Gordon | 220/342 |
| 3,441,128 | 4/1969 | Goldberg | 220/334 X |
| 3,504,180 | 3/1970 | Tone | 250/482 X |
| 3,949,872 | 4/1976 | Paudras | 220/334 |
| 4,081,686 | 3/1978 | Nieuweboer | 250/480 |
| 4,157,474 | 6/1979 | Koontz et al. | 250/480 |
| 4,264,821 | 4/1981 | Bauer | 250/481 X |

*Primary Examiner*—Steven M. Pollard
*Attorney, Agent, or Firm*—Kontler, Grimes & Battersby

[57] ABSTRACT

An x-ray film cassette includes two cassette parts which are connected at one side by a hinge and which are cylindrically curved as considered in a plane normal to the hinge. The cassette part which constitutes the bottom carries a foil of ferromagnetic material floatingly supported on an elastic strip-sloped peripheral frame, and an intensifying shield supported on this foil, while the other cassette part which constitutes the top carries a magnetic plate supported on elongated projections of the cassette wall and supporting another intensifying shield. In the closed position of the cassette, the magnetic plate attracts the ferromagnetic foil to thereby eliminate air inclusions between the intensifying shields and the x-ray film interposed therebetween.

18 Claims, 2 Drawing Figures

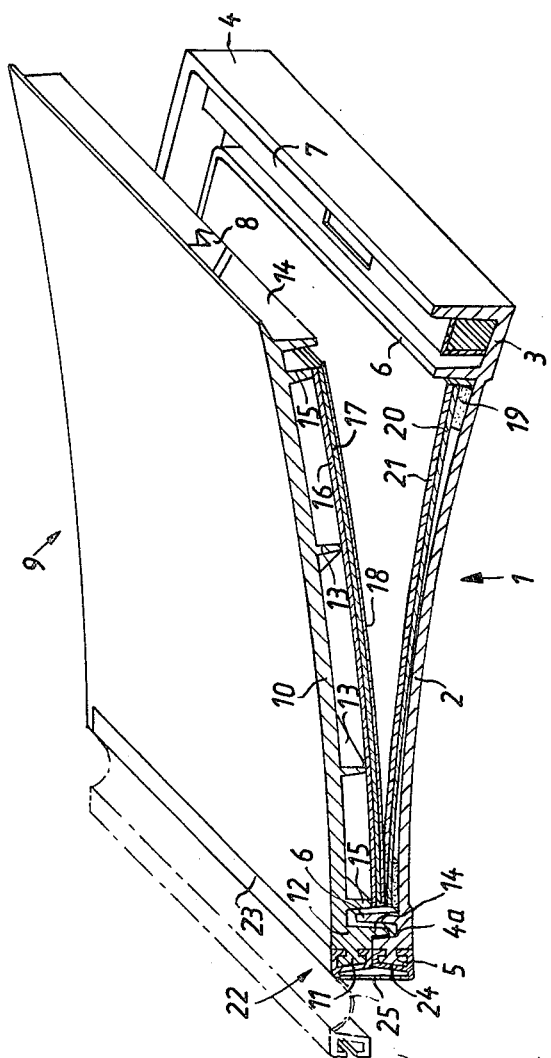
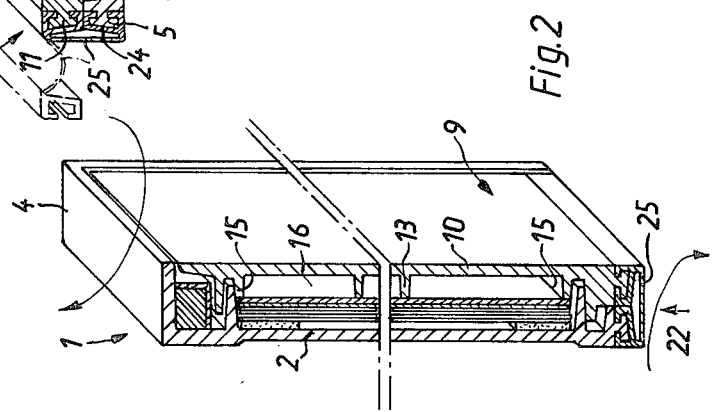

X-RAY FILM CASSETTE WITH MAGNETICALLY ATTRACTED CONFINING PLATES

BACKGROUND OF THE INVENTION

The present invention relates to film cassettes in general, and more particularly to film cassettes for x-ray films. Still more particularly, the present invention relates to film cassettes which include two cassette parts which are connected with one another by a hinge, and which respectively carry a confining plate having an area substantially corresponding to that of a film to be accommodated between the cassette parts and exerting magnetic forces over its area, and a ferromagnetic confining foil located oppositely to and magnetically attracted by the magnetic plate, wherein the x-ray film and a pair of intensifying shields are confined between the confining plate and the confining foil in the closed position of the cassette.

A cassette of this construction is known, for instance, from German patent DE-PS No. 1,112,887. This conventional cassette incorporates a sheet of an elastic material which exerts magnetic attraction forces over its entire area and which cooperates with an iron foil which is supported on the bottom of the cassette. Experience with this conventional cassette has shown that it is disadvantageous in several respects. One of the main disadvantages of this conventional cassette is that the very thin ferromagnetic foil, which simultaneously serves as a medium through which x-rays enter the internal space of the cassette, and which has a thermal expansion coefficient differing from that of the components on which this foil is supported (the difference amounting up to the factor of 10), very often becomes detached from its support and forms folds, especially when the cassette is subjected to certain temperature variations. Such temperature variations usually do not occur in a laboratory where the temperature is usually maintained at approximately the same level. However, temperature variations sufficient to have the aforementioned detrimental consequences may occur when the cassette is transferred from a well-heated treating room to an unheated storage area. Moreover, it has been established that this detachment of, and formation of folds, wrinkles or creases on, the foil occur in particular during transportation of the cassettes from one location to another in railway cars or on airplanes, especially when this transportation takes place during the wintertime or during other periods of cold weather conditions.

OBJECTS AND SUMMARY OF THE INVENTION

Accordingly, it is a general object of the present invention to avoid the disadvantages of the prior art.

More particularly, it is an object of the present invention to provide a film cassette, especially for x-ray films, which is not possessed of the disadvantages of the conventional cassettes of this type.

Still more particularly, it is an object of the present invention to so design the film cassette of the type here under consideration as to be as insensitive to temperature influences as possible.

It is yet another object of the present invention to so construct the x-ray film cassette as to improve the confining action thereof relatively to that encountered in conventional film cassettes.

A concomitant object of the invention is to develop a cassette of the type here under consideration which is simple in construction, easy and inexpensive to manufacture, and reliable nevertheless.

In pursuance of these objects and others which will become apparent hereafter, one feature of the present invention resides in a film cassette, especially for x-ray films, which, briefly stated, comprises two cassette parts which are hingedly connected to one another for movement between an open position and a closed position in which they bound a film-receiving space between themselves; a flexible magnetic plate mounted on one of the cassette parts and having an area substantially coextensive with the aforementioned space and exerting magnetic forces over this area; a ferromagnetic foil; and means (such as an elastic member, especially a narrow strip-shaped frame) for floatingly supporting the foil on the other of the cassette parts across the film-receiving space from the magnetic plate to be attracted by the foil in the closed position.

When this construction in accordance with the present invention is used, it is achieved that the ferromagnetic foil remains substantially smooth and taut, even when the temperature varies in a wide range. In this manner, it is avoided that zones without engagement could come into existence, as a result of which foggy or blurred zones would be encountered in the image on the x-ray film. Furthermore, in view of the fact that the steel foil reaches its magnetic saturation level very soon because of its minute thickness and, as a result of this, the magnetic attraction forces are limited, the pressing at the marginal zone of the foil usually creates problems. In the cassette of the invention, additional pressure is exerted on the marginal zone of the foil by the elastic frame, which pressure is sufficient for this purpose and yet is so low that the cassette walls are not bent or otherwise distorted even when the cassette has substantial dimensions. Finally, unavoidable manufacturing tolerances of the x-ray cassette are compensated for by the floating support of the foil.

The novel features which are considered as characteristic of the invention are set forth in particular in the appended claims. The improved x-ray film cassette itself, however, both as to its construction and its mode of operation, together with additional features and advantages thereof, will be best understood upon persual of the following detailed description of certain specific embodiments with reference to the accompanying drawing.

BRIEF DESCRIPTION OF THE DRAWING

FIG. 1 is a perspective view of a fragment of a partially open cassette according to the invention; and FIG. 2 is a perspective fragmentary view of the cassette of FIG. 1 in its closed position.

DETAILED DESCRIPTION OF THE PREFERRED EMBODIMENT

Referring now to the drawing in detail, and first to FIG. 1 thereof, it may be seen that the reference numeral 1 has been used therein to identify a bottom part of the cassette according to the present invention. The bottom part or cassette bottom 1 includes a cassette wall 2, and a frame 3 which circumferentially surrounds the cassette wall 2 and includes a ridge 4 which is provided at three sides or outer marginal zones of the frame 3. A projection or ridge 4a is provided at the fourth marginal zone or edge of the frame 3, the height of the ridge 4a being smaller than that of the ridge 4a. The ridge 4 is formed, at its externally facing surface, with a T-shaped rail 5. In addition thereto, there is formed on the cassette bottom 1, at a small distance from the ridges 4 and 4a, a circumferentially extending rib 6 which substantially surrounds a space for accommodating the x-ray film and which forms a part of a light barrier. A closing latch 7 is provided at that side of cassette bottom 1 which is situated remotely from the side provided with the ridge 4a, the closing latch 7 being accommodated between the ridge 4 and the rib 6 and co-operating with a hook 8 provided on a top part 9 of the cassette.

The top part or cassette top 9 is substantially of a sandwich construction and includes a cassette wall 10 on which there is provided, at the side which is to be connected to a hinge 22, a ridge 12 which is also formed with a T-shaped rail 11. Elongated diagonally extending projections 13 are provided at the inner surface of the cassette wall 10, and so are two circumferentially extending ribs 14 and 15 arranged at the periphery of the cassette wall 10. The ribs 14 and 15 constitute further parts of the light barrier and are so constructed and arranged that they embrace the rib 6 of the cassette bottom 1. In order to assure that the ribs 6, 14 and 15, which together form the light barrier, engage one another in the closed position of the cassette in a form-locking or a force-transmitting contact with one another and, in addition thereto, that the cassette top 1 and the cassette bottom 9 can be pivotally brought together about the side carrying the hinge 22, these ribs 6, 14, and 15 have surfaces which are inclined in the direction from the walls 2 and 10 to the end faces thereof. The inclination of these surfaces is approximately between 1° and 3° at the sides, and approximately between 2° and 5° at that side which carries the hinge 22. In this manner, it is assured that the ribs 6, 14 and 15, which constitute the light barrier, support one another in the closed position of the cassette and prevent twisting or bending deformation of the cassette when the latter is subjected to forces which would otherwise cause bending or twisting thereof.

The projections 13 and the inner rib 15 on the cassette wall 10 have the same height as measured from the cassette wall 10 and they carry at their end faces a thin plate 16 of synthetic plastic material. The synthetic plastic material plate 16 is advantageously connected to projections 13 and to the ribs 15 by frictional welding bonds. When the cassette top 9 is constructed in this manner as a sandwich structure including the synthetic plastic material wall 10 and the synthetic plastic material plate 16, there are achieved, on the one hand, low thicknesses and thus low weights of the components constituting the cassette top 9 and, on the other hand, a high resistance of the cassette top 9 to a deformation due to external forces acting thereon.

A magnetic plate 17 is affixed to the inwardly facing surface of the synthetic plastic material plate 16. An intensifying shield 18 is supported on this magnetic plate 17. The magnetic plate 17 is a plate having multiple poles at least at one of its sides, or a flat piece which is equipped with a plurality of magnetized strips or regions having multiple poles. The synthetic plastic material plate 16, the magnetic plate 17 and the intensifying shield 18 all have approximately the same size which corresponds to or exceeds that of the film to be accommodated in the cassette. However, the plates 16 and 17 and the shield 18 do not extend outwardly beyond the inner rib 15.

A narrow elastic band 19 of a material permeable to x-rays, preferably of a foamed material, is provided at the wall 2 of the cassette bottom 1. The band or strip 19 is connected to the cassette wall 2 and extends along the rib 6 and within the space of rectangular configuration which is surrounded by the rib 6. A thin foil 20 of ferromagnetic material is connected to the elastic strip 19, and an additional intensifying shield 21 is connected to the inwardly facing surface of the foil 20. Both the foil 20 and the additional intensifying shield 21 have a size which approximately corresponds to that of the intensifying shield 18.

The cassette walls 2 and 10 have, in their original condition which corresponds to the open position of the cassette, a slight cylindrical pre-deformation or, in other words, these cassette walls 2 and 10 are slightly cylindrically curved when viewed from the side of the cassette carrying the hinge 22 to the opposite side while the cassette is in its open position. The convex sides of these curvatures face one another as the cassette parts 1 and 9 approach the closed position of the cassette. While the synthetic plastic material plate 16, the magnetic plate 17, and the intensifying shield 18 participate in this curving of the wall 10 in the open position of the cassette, the foil 20 and the additional intensifying shield 21 remain in an approximately planar condition as a result of the floating support of the foil 20 on the strip 19. In order to reinforce the relatively thin cassette wall 2 of the cassette bottom 1, this wall 2 can also have a spherical curvature which is oriented toward the cassette lid 9.

The cassette top 1 and the cassette bottom 9 are connected to one another by the aforementioned hinge 22 which, generally speaking, includes two elongated rails 23 and 24 of rectangular cross-section which are connected to one another by a flexible band 25 which is also cylindrically pre-deformed. Each of the rails 23 and 24 is provided, at one of its longitudinally extending surfaces, with a groove or recess having a cross-sectional configuration compatible with or identical to the cross-sectional contour of the T-shaped projections of rails 5 and 11 on the cassette parts 1 and 9. The flexible band 25 which is connected to the rails 23 and 24 at their sides which are opposite to those provided with the recesses or grooves, has a tendency to move the rails 23 and 24 from the mutually adjacent position illustrated in full lines in FIG. 1 into the position which is indicated in FIG. 1 in phantom lines, in which position the recesses in the rails 23 and 24 face in opposite directions. This pretensioning of the elastic or flexible band 25 enhances the tendency of the cassette to assume its open position after the latching means 7, 8 has been disengaged, which tendency exists in any event as a result of the cylindrical pre-deformation of the walls 2 and 10.

Such an automatic movement of the cassette parts 1 and 9 and of their walls 2 and 10 away from one another after the release of the latching means 7, 8 has the advantage that the cassette can be handled in a simple manner by automatic feeding and withdrawing arrangements for the cassettes, in which arrangements the x-ray film is introduced into or withdrawn from the space bounded by the ribs 6, 14 and 15. In addition thereto, it is highly advantageous, considering the magnetic interaction between the magnetic plate 17 and the foil 20, when the cassette parts 1, 9 do not move away from one another in directions substantially normal thereto, but when they peel off from one another in accordance with their cylindrical pre-deformation.

A thin steel foil having a thickness of approximately 0.01 to 0.05 millimeters, preferably of 0.02 millimeters, can be used, for instance, for the foil 20. As a result of the minute thickness of this foil 20, the absorption of the x-rays is significantly reduced as compared to that encountered in conventional cassettes.

In order to make the magnetic attraction forces as strong as possible, the steel foil 20 should be made of pure iron, inasmuch as alloyed steel becomes progressively more non-magnetic as the degree of its alloying increases. However, the danger of corrosion damage is especially pronounced when pure iron is used as the material of the foil 20. Thus, it is contemplated by the present invention to protect the foil 20 from ambient conditions which would cause it to corrode. If an electrolytically deposited coating were provided on the foil 20 to protect the same from corrosion, it would increase the absorption of x-rays, which is very disadvantageous in the environment in which the foil 20 is being used. On the other hand, coating the foil 20 with a layer of paint or lacquer is highly problematical because of the small thickness of the foil and the attendant vulnerability thereof. Therefore, it is proposed, according to a further feature of the present invention, to form a laminate of the foil 20 and of a thin polyethylene foil having a thickness preferably not in excess of 0.05 millimeters. This expedient has not been shown in the drawing since it is self-evident how this polyethylene foil is situated relative to the foil 20 and since the illustration thereof would obscure the drawing. The polyethylene foil which is laminated to the foil 20 protects the latter from environmental influences and thus against corrosion. In addition thereto, the foil 20 is slightly reinforced by this lamination, whereby the danger of development of folds, wrinkles or creases therein is significantly reduced. However, the absorption of x-rays is increased by this laminar construction only insignificantly, if at all.

The magnetic plate 17 is preferably produced from an Alnico alloy, from oxidic permanent magnets, from magnetically coated PVC foils, or from magnets consisting of oxide powder and binder and manufactured in an injection molding operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivelence of the claims.

I claim:

1. A film cassette, especially for x-ray film, comprising a pair of cassette parts movable between an open position and a closed position in which said cassette parts define a film-receiving space; a magnetic plate mounted on one of said cassette parts; a ferromagnetic foil on the other of said cassette parts responsive to the magnetic force of said magnetic plate in said closed position; and means floatingly supporting said foil on said other cassette part, wherein said floatingly supporting means includes an elastic member in the form of a narrow strip-shaped frame arranged at the periphery of said foil and interposed between said other cassette part and said foil, said other cassette part includes a cassette wall which is cylindrically inwardly curved in said open position; and wherein said elastic frame has such a height that said foil at most barely touches said cassette wall at a central region thereof and does not contact said cassette wall at the region within said narrow strip-shaped frame when in said closed position.

2. The film cassette as defined in claim 1, wherein said cassette parts are hingedly connected to one another.

3. The film cassette as defined in claim 1, wherein said magnetic plate is flexible.

4. The film cassette as defined in claim 1, wherein said magnetic plate is substantially coextensive with said space.

5. The film cassette as defined in claim 1, wherein said elastic member is of a material permeable by x-rays.

6. The film cassette as defined in claim 1, wherein said elastic member is of a foam material.

7. The film cassette as defined in claim 1, wherein said other cassette part has a rib extending along a substantially rectangular course around said film-receiving space, and wherein said elastic frame is situated at the inwardly facing side surface of said rib.

8. The film cassette as defined in claim 1, wherein said foil is approximately between 0.01 and 0.05 millimeters thick.

9. The film cassette as defined in claim 8, wherein the thickness of said foil is substantially 0.02 millimeters.

10. The film cassette as defined in claim 1; and further including an intensifying shield on the surface of said foil facing said film-receiving space.

11. The film cassette as defined in claim 10, wherein said intensifying shield is adhesively bonded to said foil.

12. The film cassette as defined in claim 1, further comprising a polyethylene foil having a thickness of at most 0.05 millimeters and forming a laminate with said ferromagnetic foil.

13. The film cassette as defined in claim 1, wherein said magnetic plate comprises an Alnico alloy.

14. The film cassette as defined in claim 1, wherein said magnetic plate comprises oxidic permanent magnets.

15. The film cassette as defined in claim 1, wherein said magnetic plate comprises a magnetically coated PVC foil.

16. The film cassette as defined in claim 1, wherein said magnetic plate comprises injection-molded magnets of oxide powder and binder.

17. The film cassette as defined in claim 1, wherein both said cassette parts include respective relatively thin elastically deformable cassette walls which assume cylindrical configurations in said open position, and reinforcing portions which cooperate with one another in said closed position to give said cassette walls substantially planar configurations and to reinforce the cassette against twisting deformation.

18. The film cassette as defined in claim 1, wherein said one cassette part includes a plurality of inwardly extending projecting portions; further comprising a relatively thin support plate of synthetic plastic material supported on said projecting portions; and wherein said magnetic plate is mounted on said support plate.

* * * * *